(12) United States Patent
Dunphy et al.

(10) Patent No.: US 9,223,101 B2
(45) Date of Patent: Dec. 29, 2015

(54) OPTICAL TRANSDUCER WITH INTEGRATED FEEDTHROUGH

(71) Applicant: WEATHERFORD/LAMB, INC., Houston, TX (US)

(72) Inventors: James R. Dunphy, South Glastonbury, CT (US); John J. Grunbeck, Northford, CT (US); Bryan Boemmels, North Haven, CT (US); Guy Daigle, Bristol, CT (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 278 days.

(21) Appl. No.: 13/789,863

(22) Filed: Mar. 8, 2013

(65) Prior Publication Data
US 2013/0236152 A1 Sep. 12, 2013

Related U.S. Application Data

(60) Provisional application No. 61/608,569, filed on Mar. 8, 2012.

(51) Int. Cl.
| G02B 6/44 | (2006.01) |
| G02B 6/42 | (2006.01) |
| G01D 5/353 | (2006.01) |
| G02B 6/02 | (2006.01) |

(52) U.S. Cl.
CPC .......... *G02B 6/4428* (2013.01); *G01D 5/35316* (2013.01); *G02B 6/4248* (2013.01); *G02B 6/022* (2013.01); *G02B 6/02204* (2013.01)

(58) Field of Classification Search
None
See application file for complete search history.

(56) References Cited

U.S. PATENT DOCUMENTS

| 7,447,390 B2 | 11/2008 | Dunphy et al. |
| 7,747,126 B2 | 6/2010 | Dunphy et al. |
| 7,751,677 B2 | 7/2010 | Dunphy et al. |
| 2007/0003206 A1 | 1/2007 | Dunphy et al. |

FOREIGN PATENT DOCUMENTS

JP 06-200949 A2 7/1994

OTHER PUBLICATIONS

International Preliminary Report on Patentability for PCT/US2013/030002, dated Sep. 9, 2014.*
Japanese Office Action dated Sep. 15, 2015, in corresponding JP Application No. P2014-561165.

* cited by examiner

*Primary Examiner* — Mike Stahl
(74) *Attorney, Agent, or Firm* — Patterson & Sheridan, L.L.P.

(57) ABSTRACT

An optical transducer is provided. A "measuring" portion of the transducer may be exposed to a high pressure and fluids when the optical transducer is deployed (e.g., in a wellbore or other industrial setting). The transducer may include an optical waveguide with a first portion that forms a first seal that isolates an "instrumentation" portion of the transducer from exposure to the high pressure and fluids to which the measuring portion may be exposed. The transducer may also include a second seal with a "stack" of material elements that contact a second portion of the optical waveguide to also isolate the instrumentation portion of the transducer from exposure to the high pressure and fluids to which the measuring portion may be exposed.

20 Claims, 5 Drawing Sheets

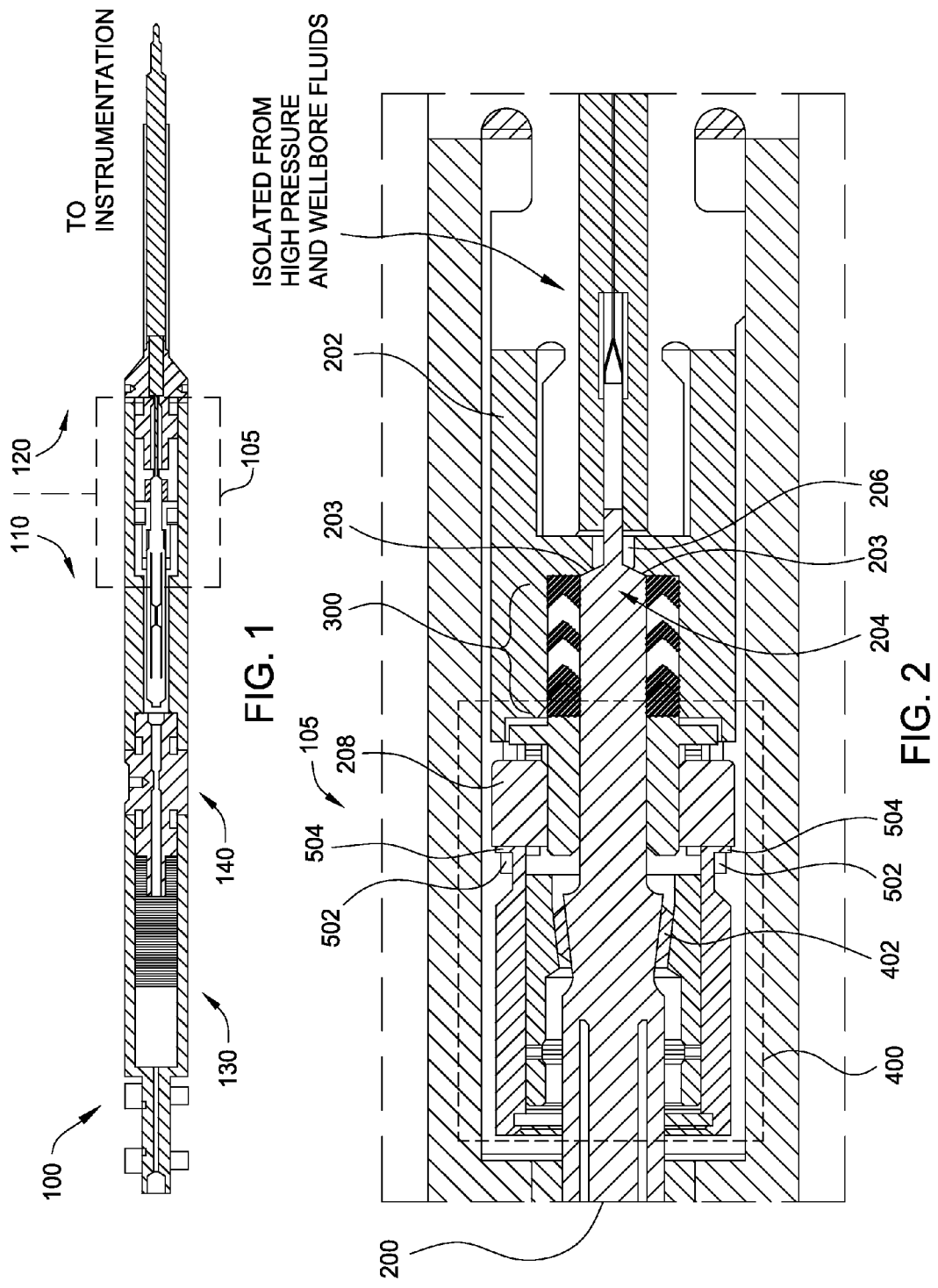

OPTICAL TRANSDUCER WITH INTEGRATED FEEDTHROUGH

CLAIM OF PRIORITY UNDER 35 U.S.C. §119

This application claims benefit of U.S. Provisional Patent Application No. 61/608,569, filed Mar. 8, 2012 and entitled "Optical Transducer with Integrated Feedthrough," which is herein incorporated by reference in its entirety.

BACKGROUND OF THE INVENTION

1. Field of the Invention

Embodiments of the invention generally relate to feedthroughs and, more particularly, to feedthroughs suitable for use in high pressure, high temperature, and/or other harsh environments.

2. Description of the Related Art

Many industries and applications utilize apparatus sensors to measure parameters, such as pressure. In some cases, such sensors may utilize optical waveguides that are designed to penetrate a wall, bulkhead, or other feedthrough member wherein a relatively high fluid differential pressure exists across a feedthrough member. In addition, one or both sides of the feedthrough member may be subjected to relatively high temperatures and other harsh environmental conditions, such as corrosive or volatile gases, liquids, and other materials. For example, a bulkhead feedthrough may call for sealing an optical waveguide at high pressures of about 138,000 kilopascal (kPa) and above, and high temperatures of about 150° C. to 300° C. and above, with a service life of 5 to 20 or more years.

Several challenges exist with constructing a sensor utilizing such an optical fiber feedthrough. One of these problems involves the susceptibility of the glass fiber to damage and breakage due to its small size, flexibility, and brittle nature. Another challenge involves the potential for leaks when the optical fiber is sealed in a feedthrough bore using epoxy or other bonding materials, which may crack when exposed to an extreme range of temperatures and pressures.

SUMMARY OF THE INVENTION

Embodiments of the invention generally relate to feedthroughs (e.g., feedthroughs for optical sensors, slickline, wireline, other electrically or optically conductive lines or pathways, and the like) suitable for use in high pressure, high temperature, and/or other harsh environments.

For some embodiments, an optical transducer is provided. A "measuring" portion of the transducer may be exposed to a high pressure, high temperature fluids when the optical transducer is deployed (e.g., in a wellbore or other industrial setting). The transducer may include an optical waveguide with a first portion that forms a first seal that isolates an "instrumentation" portion of the transducer from exposure to the high pressure and fluids to which the measuring portion may be exposed. The transducer may also include a second seal with a "stack" of material elements that contact a second portion of the optical waveguide to also isolate the instrumentation portion of the transducer from exposure to the high pressure and fluids to which the measuring portion may be exposed.

Together, the first and second seals may be considered to form primary and secondary seals, providing redundancy and some assurance of sealing (backup) even in the case where one seal is breached. Which is considered primary or secondary may be relatively arbitrary. Exact materials of various components of the transducer may be selected based on the desired pressure performance and the temperature criteria. For example, the second seal may include a stack of two or more (possibly alternating) materials selected to achieve a desired temperature performance while still maintaining the integrity of their shape for adequate sealing.

One embodiment of the present invention provides an optical transducer. The optical transducer generally includes at least one optical waveguide; at least one sensing element formed in a portion of the optical waveguide; and a feedthrough element designed to isolate a first portion of the transducer in communication with the sensing element from a second portion of the transducer containing the sensing element, wherein the feedthrough element comprises at least a first seal formed by a first portion of the optical waveguide in contact with a bore extending through a housing of the feedthrough element and a second seal formed by contact between an arrangement of sealing elements with a second portion of the optical waveguide and an inner surface of the feedthrough housing.

Another embodiment of the present invention provides an optical transducer. The optical transducer generally includes at least one optical waveguide; at least one sensing element disposed in a portion of the optical waveguide; and a feedthrough element designed to isolate a first portion of the transducer in communication with the sensing element from a second portion of the transducer containing the sensing element, wherein the feedthrough element comprises a seal formed by a first portion of the optical waveguide in contact with a bore extending through a housing of the feedthrough element and wherein a portion of a mating surface of the bore for forming the seal is undercut to reduce at least one of a magnitude or a gradient of a stress distribution in a region transitioning from high stress to no stress along the first portion of the optical waveguide.

Yet another embodiment of the invention provides a feedthrough assembly. The assembly generally includes at least one conductive line and a feedthrough element designed to isolate a first portion of the assembly from a second portion of the assembly, wherein the feedthrough element comprises a first seal formed by a first portion of the line in contact with a bore extending through a housing of the feedthrough element and wherein a portion of a mating surface of the bore for forming the first seal is undercut to reduce at least one of a magnitude or a gradient of a stress distribution in a region transitioning from high stress to no stress along the first portion of the line. The at least one conductive line may include at least one of an optical waveguide or a wireline. For some embodiments, a pre-loading force is applied to promote sealing of the first seal prior to deployment in an operating environment. For some embodiments, the feedthrough element also includes a second seal formed by contact between an arrangement of sealing elements with a second portion of the line and an inner surface of the feedthrough housing.

Yet another embodiment of the invention provides a feedthrough assembly. The assembly generally includes at least one conductive line and a feedthrough element designed to isolate a first portion of the assembly from a second portion of the assembly, wherein the feedthrough element comprises at least a first seal formed by a first portion of the line in contact with a bore extending through a housing of the feedthrough element and a second seal formed by contact between an arrangement of sealing elements with a second portion of the line and an inner surface of the feedthrough housing.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a cross-sectional diagram of an optical transducer with an integrated feedthrough, according to embodiments of the invention.

FIG. 2 is a cross-sectional diagram of the feedthrough portion of the optical transducer shown in FIG. 1, according to embodiments of the invention.

DETAILED DESCRIPTION

Figure 3:
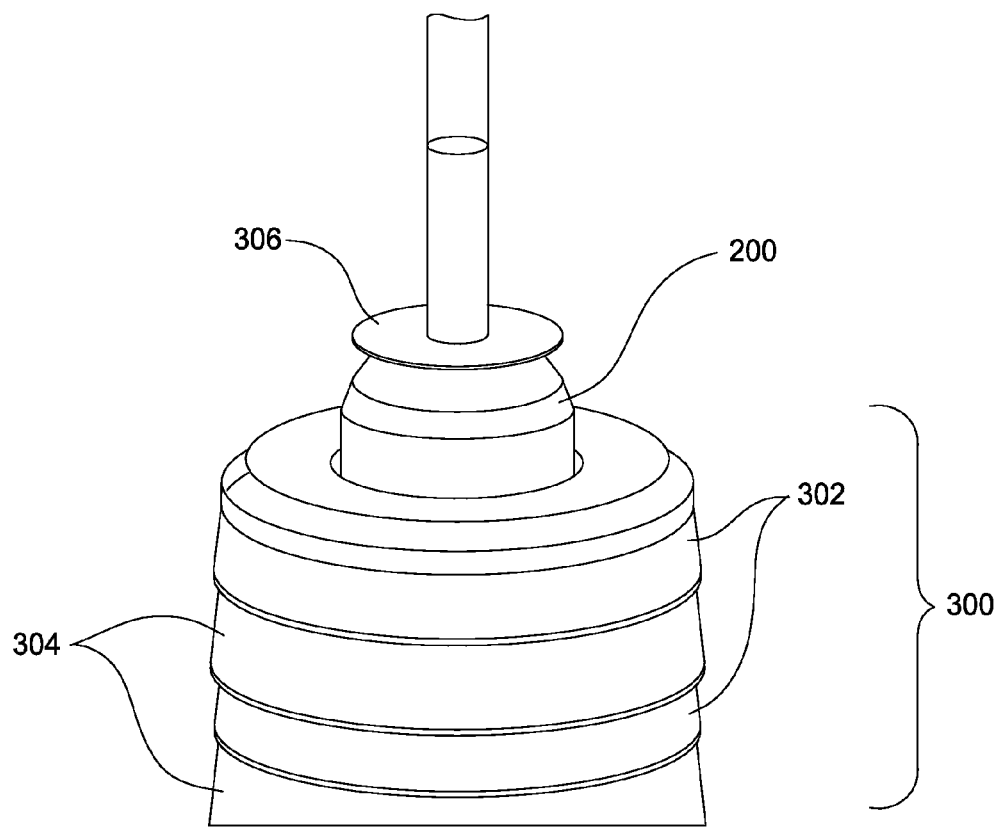
FIG. 3 illustrates an example stack of materials for a dynamic seal, according to embodiments of the invention.

Embodiments of the invention generally relate to feedthrough assemblies applicable for use in high temperature, high pressure environments. While transducers with optical waveguide feedthrough assemblies are described in detail below, embodiments of the invention also apply to other types of feedthroughs (e.g., wireline feedthrough assemblies, where wireline for electrical communication, logging, or running and retrieving downhole tools is isolated from harsh environments).

According to some embodiments, an optical transducer may incorporate a feedthrough assembly having a first seal formed by a frustoconical glass plug disposed in a recess (e.g., a counterbore) of a feedthrough housing. The glass plug may define a large-diameter, cane-based, waveguide sealed within the recess in the housing and providing optical communication through the housing. All embodiments described herein provide for sealing with respect to the housing at or around the glass plug as the glass plug is brought into contact with a sealing surface of the recess.

As used herein, "optical fiber," "glass plug," and the more general term "optical waveguide" refer to any device for transmitting optical signals along a desired pathway. For example, each of these terms can refer to single mode, multi-mode, birefringent, polarization-maintaining, polarizing, multi-core or multi-cladding optical waveguides, or flat or planar waveguides. The optical waveguides may be made of any glass (e.g., silica, phosphate glass, or other glasses), glass and plastic, or solely plastic. Furthermore, any of the optical waveguides can be partially or completely coated with a gettering agent and/or a blocking agent (such as gold) to provide a hydrogen barrier that protects the waveguide.

FIG. 1 shows an example optical transducer 100 incorporating a feedthrough (F/T) element 105 that isolates a first (measuring) portion 110 of the transducer from a second (instrumentation) portion 120 of the transducer. The measuring portion 110 of the transducer may be used to sense a parameter (e.g., temperature or pressure) and convert the sensed parameter to a varying optical signal. The instrumentation portion 120 may provide an interface for sending the optical signals to electronic sensing equipment via a connector and an optical cable having one or more optical fibers.

As illustrated, according to certain aspects, the transducer 100 may be a pressure transducer, and the measuring portion 110 may include a pressure foot and bellows assembly 130, which may move axially in response to external pressure, thereby transferring pressure changes to a filling fluid inside of the bellows assembly and to a sensing element. The sensing element may be formed from an optical waveguide having one or more Bragg gratings formed therein. The pressure changes in the filling fluid may cause a change in a grating wavelength. One or more second gratings may be isolated from changes in pressure or configured to respond with different sensitivities, providing for unique and separated values of the pressure and temperature changes via solutions to the resulting system of multiple equations.

The sensing element may be contained in a filling fluid (e.g., silicone oil) providing some protection and dampening, as well as transferring the pressure changes to the sensing element. As illustrated, this portion may be filled via an integrated fill port 140, which may be sealed to ensure no communication between the environment (e.g., wellbore fluids) outside of the transducer and the housing containing the filling fluid. In some cases, this sealing may be accomplished by a sealing element and, for some embodiments, by a threaded element. The threaded element may provide reinforcement of the sealing element and may act as a backup seal to contain any leaks if the sealing element fails.

As shown in FIG. 2, a sealing portion 204 of the optical waveguide 200 may be conical (or frustoconical) shaped and mate with a complementary shaped mating surface of a bore in a metal housing 202, thereby forming a glass-to-metal seal 203. Naturally occurring pressure during deployment and operation (e.g., within a wellbore) may force the sealing portion 204 towards the mating surface forming a seal. As will be described in greater detail below, a mechanism may also be provided to "pre-load" the glass-to-metal seal 203 during fabrication of the transducer 100, prior to transportation and deployment.

For some embodiments of the invention, an element, such as a thin washer 306 (illustrated in FIG. 3), may be used between the sealing portion 204 and the mating surface of the housing 202 to promote sealing (e.g., by filling in any imperfections between the sealing surfaces, as well as alleviating the concentration of contact stresses). The washer 306 may comprise any suitable material for aiding the glass-to-metal seal 203, such as a relatively soft metal (e.g., gold).

As described above, the optical waveguide 200 in the instrumentation portion 120 may be connected with an optical cable for sending the optical signals to electronic sensing equipment. Similarly, in a wireline feedthrough assembly, for example, the one or more wirelines may pass through the feedthrough element's housing and couple with a connector and an electrical cable having one or more wires for sending the electrical signals traversing the wirelines to electronic equipment.

Unlike conventional feedthrough optical transducers, the optical waveguide 200 is a monolithic structure providing both the sensing and the feedthrough aspects. In contrast, conventional transducers typically include two separate components to achieve these aspects: a sensing optical waveguide and a separate feedthrough glass plug, connected with the sensing waveguide via an optical fiber jumper. Furthermore, the optical fiber jumper is exposed to high pressures and potentially harmful fluids in conventional designs. The removal of such a jumper fiber from embodiments of the invention reduces the risks of performance failures.

When axially loading elements of brittle materials, such as glass as in the present example, stresses may be relatively linear across the mating surfaces of the elements before abruptly encountering a region transitioning from "high compression stress" to "no stress" at the end of the mating surface. This abrupt transition may result in a concentration of tensile stress at this region, which may lead to brittle material distortion and, ultimately, breakage. According to certain aspects, however, the magnitude and gradient of the transitional stress distribution may be reduced as shown in FIG. 2, by removing (e.g., undercutting) a portion of the mating surface of the housing 202, such that a gap 206 is created when the glass plug is seated in a complementary counterbore of the housing. This removal may be performed, for example, by undercutting the housing 202 along an inner ring of the bore's mating surface. In this case, the resulting surface of the housing 202 opposite the counterbore may have an annular undercut, as illustrated in FIG. 2. For other embodiments, the reduction in the magnitude and gradient of the transitional stress distribution may be accomplished by casting or otherwise forming a housing 202 initially having an annular undercut opposite the counterbore, such that removal need not be performed. This reduction of the magnitude and gradient of the transitional stress distribution from high compression to no compression may help prevent breakage. In the case of the transducer 100, this modification of the mating surface removes a failure mode, thereby increasing the reliability and lifetime of the transducer.

As illustrated in FIG. 2, the feedthrough element 105 may also include one or more dynamic seals (commonly referred to as "chevron" seals or v-seals due to their "v" shape in cross section) as a second sealing feature. In an assembled product, these dynamic seals may contact a second portion of the optical waveguide 200 and the housing 202, providing backup to the glass-to-metal seal 203 (or the glass-to-metal seal could be viewed as providing backup to the dynamic seals). As greater pressure is applied, the dynamic seals are compressed axially and further expanded radially, thereby tightening the seal between the optical waveguide 200 and housing 202. Furthermore, the dynamic seals may also centralize the optical waveguide 200 within the transducer 100, relative to the bore of the feedthrough housing 202 and to the glass-to-metal seal 203.

As previously described, exact materials of various components of the transducer 100 may be selected based on desired performance and temperature criteria. For example, the second sealing feature may include a "stack" 300 of two or more (possibly alternating) materials 302, 304 as shown in FIG. 3. The material 302, 304 may be selected to achieve desired temperature performance while still maintaining integrity of their shape for adequate sealing. Examples of such materials may include PEEK, Teflon, a polyimide, and other polymers. In some cases, for a relatively high temperature rating (e.g., up to 250° C.), a transducer may include a stack of alternating PEEK and Teflon. An even higher temperature rating (e.g., >300° C.) may be achieved by utilizing graphite, graphite-reinforced polymers, or certain high performance polyimides, such as PMR-15, in the stack 300. Of course, general substitutions between materials may be made, as appropriate, and materials of other parts may also be replaced to increase the temperature rating and the reliability.

Another feature that increases the temperature rating and the reliability of the transducer 100 is the lack of epoxy or other bonding material used in the measurement portion 110. Conventional optical feedthrough designs typically expose epoxy used as a sealing feature in the measurement portion 110 to high temperatures. However, the structural integrity of epoxy can fail at such high temperatures, thereby leading to unacceptable leaks in the seal. With the glass-to-metal seal 203 and/or the dynamic seals in embodiments of the present invention, epoxy need not be used in the transducer 100.

Figure 4:
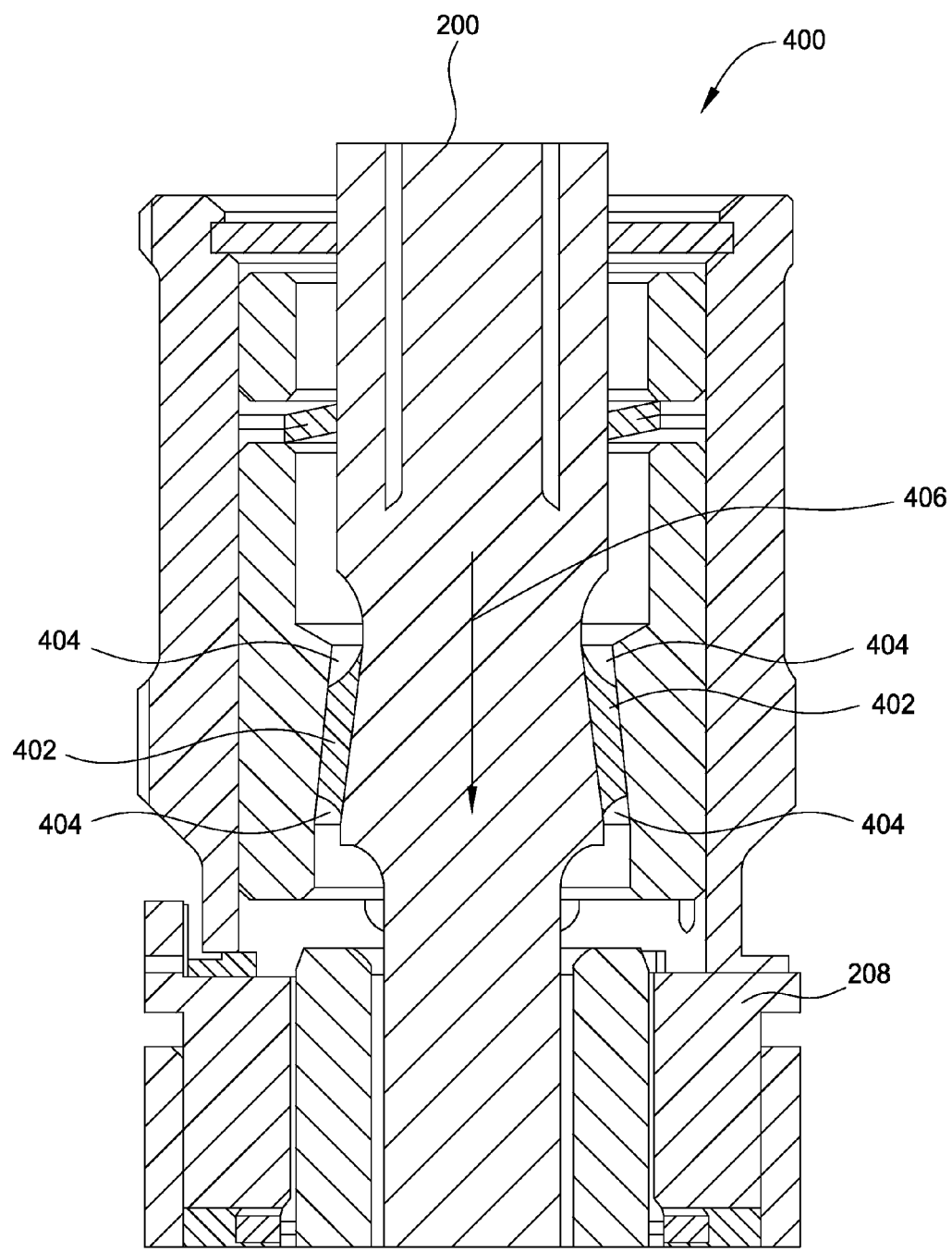
FIG. 4 is a cross-sectional diagram of an example pre-loaded portion of the transducer illustrated in FIG. 1, according to embodiments of the invention.

Material removals to reduce the magnitude and gradient of stress distributions at component interfaces, as described above, may also be utilized in the pre-loaded portion 400 of the transducer 100 shown in FIG. 4. As illustrated, a shape of the waveguide 200 may be designed to allow an axial force 406 to be applied to the waveguide during the assembly process. This pre-loading may help maintain contact in the glass-to-metal seal 203 before exposure to operating pressure. However, the stress concentrations that develop in the contact areas between the waveguide 200 and one or more members 402 (e.g., a clamp) used to apply force during pre-loading may result in damage to the optical waveguide. Therefore, as illustrated in FIG. 4, one or more portions 404 of a member 402 may be removed (e.g., undercut) in an effort to reduce the magnitude and gradient of stress concentrations imposed on the waveguide 200 during pre-loading. The members 402 may be composed of any suitable material, such as plastic, and may be held in place by a collar in the pre-loaded portion 400.

For some embodiments, an axial pre-loading force may also be applied to the stack 300 during fabrication of the transducer 100. This pre-loading force may be used to axially compress and radially expand the dynamic seals and create the seal between the optical waveguide 200 and the housing 202. For some embodiments, the pre-loading force may be supplied by a v-seal pre-loader 208, as illustrated in FIGS. 2 and 4.

According to certain aspects, one or more diagnostic sensors (e.g., Bragg gratings) may be utilized to monitor the amount of force applied during pre-loading. In some cases, such a diagnostic sensor may be placed in any suitable position along the waveguide 200 that is subject to the pre-loading forces, such as between the pre-loaded portion 400 and the sealing portion 204 of the optical waveguide 200. Such a diagnostic sensor may, for example, be monitored during the pre-loading and utilize a different wavelength band than the sensors used in the sensing element.

Figure 5:
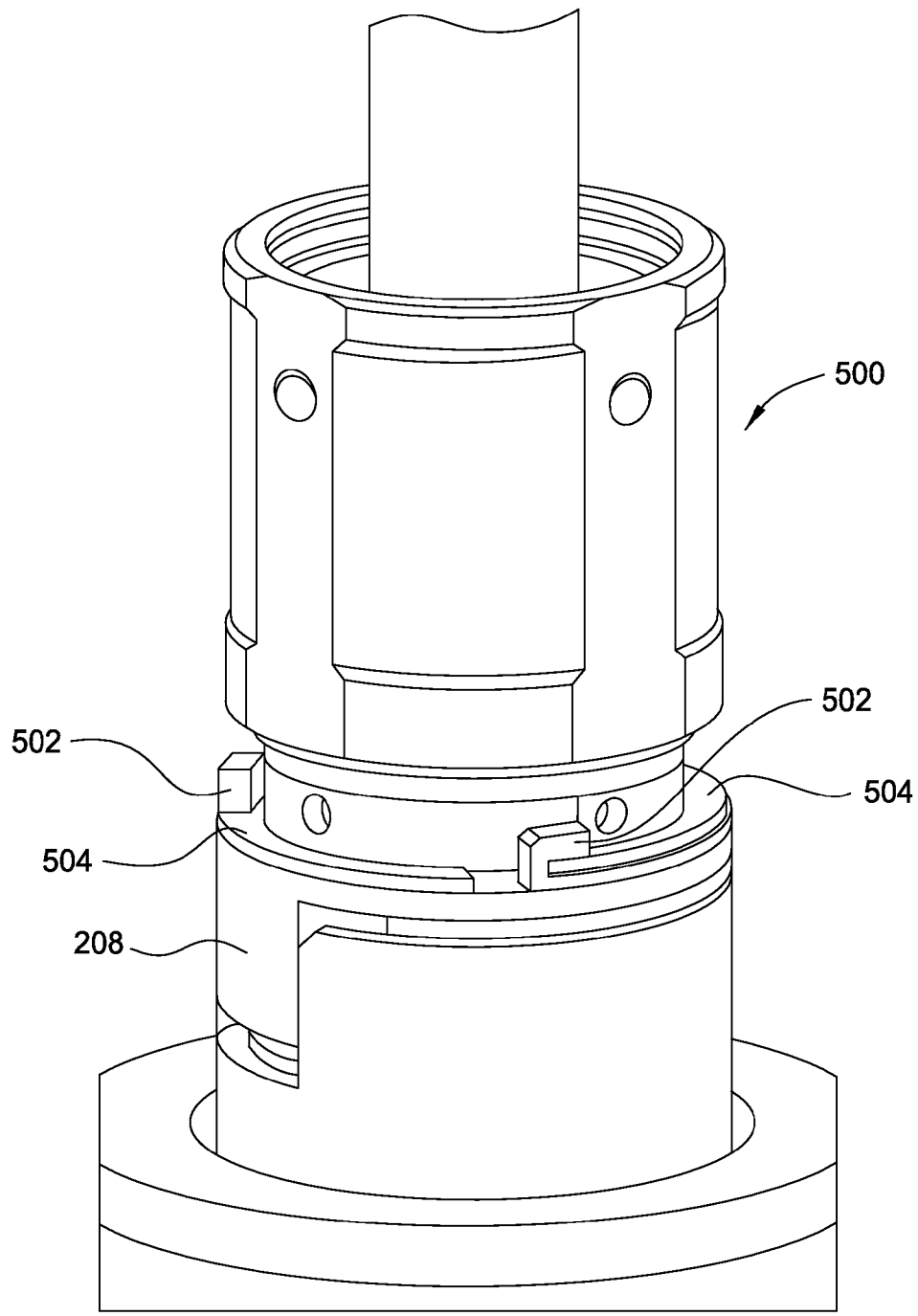
FIG. 5 illustrates an example exterior view of the portion of the transducer illustrated in FIG. 4, according to embodiments of the invention.

FIG. 5 illustrates an exterior view of the pre-loaded portion 400 depicted in FIG. 4. The pre-loaded portion 400 may include a pre-loader housing 500 that surrounds the optical waveguide pre-loaded with the use of the member(s) 402. A flange 504 of the pre-loader housing may be retained axially by one or more retention members of the v-seal pre-loader 208, such as the bayonet-shaped members 502 shown in FIG. 5. Retention of the pre-loader housing in this manner allows the housing to be radially shifted, such that a center of the housing may be disposed on-axis or slightly off-axis with respect to the bore of the housing 202 (and the axis of the v-seal pre-loader 208). With this potential radial shift of the pre-loader housing, a bending force on the optical waveguide 200 is avoided, or at least reduced, during assembly of the transducer 100. Minimizing this bending force avoids stressing the optical waveguide, such that shock loads do not crack the optical waveguide and lead to transducer failure.

During transducer assembly, the pre-loader housing may be disposed above the v-seal pre-loader 208 to surround the members 402, rotated such that the flange 504 is retained by the members 502, and positioned radially in an effort to avoid, or at least reduce, bending forces on the optical waveguide 200. Then, the flange 504 of the pre-loader housing may be welded in position above the v-seal pre-loader 208. Should the flange welds fail during operation of the transducer, the members 502 prevent the pre-loader housing 500 from moving axially away from the v-seal pre-loader 208.

Figure 6:
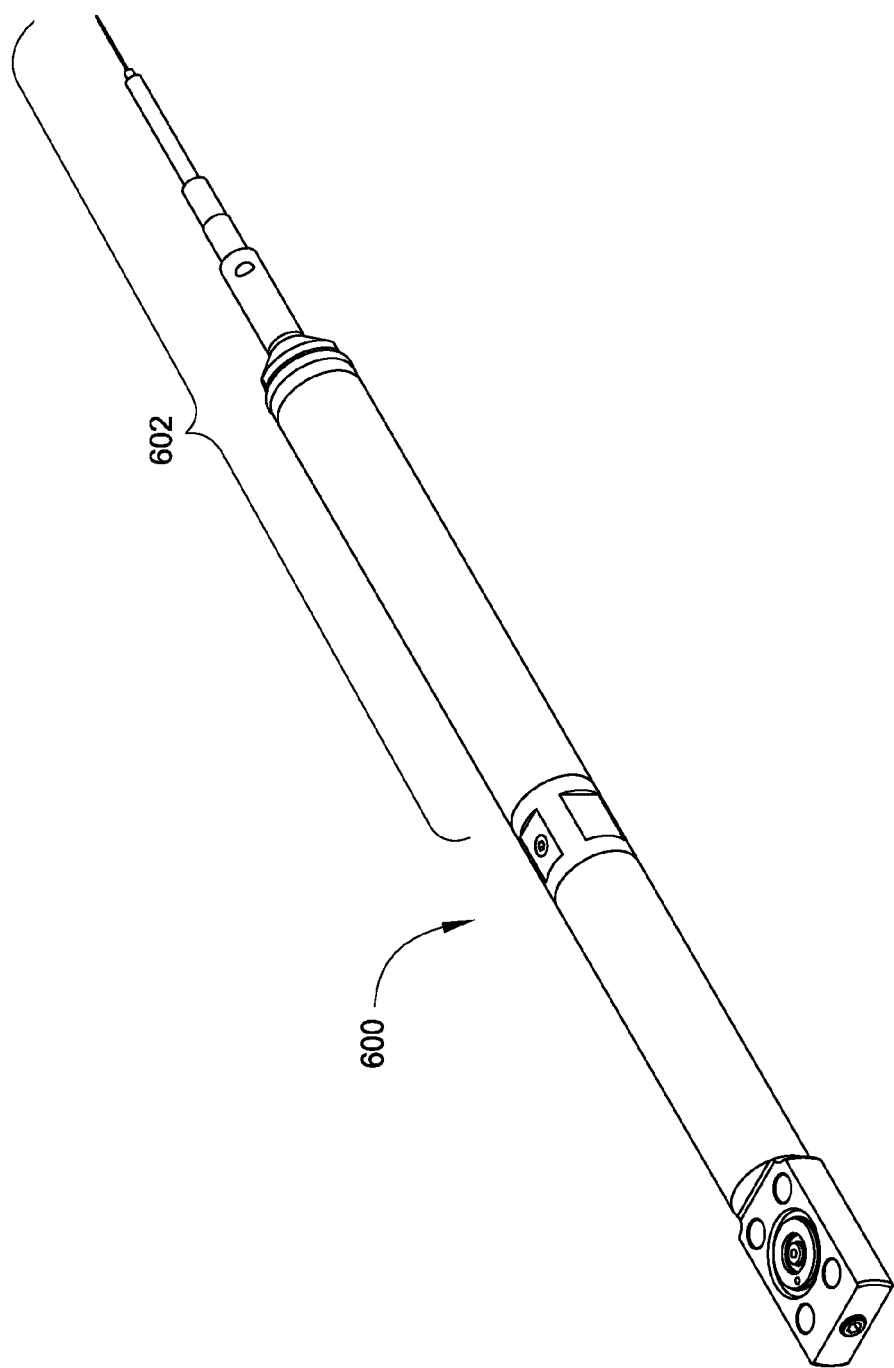
FIG. 6 illustrates an example final assembly of a transducer, according to embodiments of the invention.

FIG. 6 illustrates an example final assembly of a transducer 600 in accordance with aspects of the present disclosure. Installation of the completed assembly may be relatively straightforward, for example, with the pressure foot of the sensing portion bolted onto a mandrel pressure port in an area to be measured. Connections for instrumentation may be made on the instrumentation side 602, with isolation from the measured environment provided by the sealing features described above.

Embodiments of the invention offer several advantages over conventional optical transducers with feedthrough features. For example, transducers described above may achieve a higher long-term operating temperature (at least 200° C., and in some cases in excess of 300° C.) than conventional transducers, which typically fail above 150° C. (e.g., due to breakdown of the epoxy, glue, or other bonding material). With the use of the bellows assembly in the measurement portion of the transducer, any optical fiber or other glass components are isolated from harmful fluids. Furthermore, the features described above for reducing or eliminating damage to brittle materials lead to significantly lowered risk of failure during transportation, deployment, and operation of the transducer. Overall, the various attributes described above lead to feedthrough optical transducers with increased reliability and lifetimes compared to conventional feedthrough transducers.

While the foregoing is directed to embodiments of the present invention, other and further embodiments of the invention may be devised without departing from the basic scope thereof, and the scope thereof is determined by the claims that follow.

The invention claimed is:

1. An optical transducer, comprising:
   at least one optical waveguide;
   at least one sensing element disposed in a portion of the optical waveguide;
   a feedthrough element designed to isolate a first portion of the transducer in communication with the sensing element from a second portion of the transducer containing the sensing element, wherein the feedthrough element comprises:
      a first seal formed by a first portion of the optical waveguide in contact with a bore extending through a housing of the feedthrough element; and
      a second seal formed by contact between an arrangement of sealing elements with a second portion of the optical waveguide and an inner surface of the feedthrough housing; and
   a member in contact with a third portion of the optical waveguide and configured to apply a first pre-loading force to promote sealing of at least the first seal, wherein the third portion of the optical waveguide has a greater outer diameter than the first and second portions of the optical waveguide.

2. The optical transducer of claim 1, wherein a second pre-loading force promotes sealing of the second seal by expanding the sealing elements.

3. The optical transducer of claim 1, further comprising a diagnostic grating disposed in the optical waveguide allowing the first pre-loading force to be measured.

4. The optical transducer of claim 1, wherein a portion of a surface of the member is undercut to reduce at least one of a magnitude or a gradient of a stress distribution in a region transitioning from high stress to no stress along the third portion of the optical waveguide.

5. The optical transducer of claim 1, wherein the member is configured to apply the first pre-loading force such that a bending force on the optical waveguide during assembly is avoided.

6. The optical transducer of claim 1, wherein a portion of a mating surface of the bore for forming the first seal is undercut to reduce at least one of a magnitude or a gradient of a stress distribution in a region transitioning from high stress to no stress along the first portion of the optical waveguide.

7. The optical transducer of claim 1, wherein the sealing elements comprise at least two elements, alternating between at least two materials.

8. The optical transducer of claim 7, wherein at least one of the two materials comprises a polymer.

9. The optical transducer of claim 7, wherein at least one of the two materials comprises PMR-15, graphite, or a graphite-reinforced polymer.

10. The optical transducer of claim 7, wherein the at least two materials comprise PEEK and Teflon.

11. An optical transducer, comprising:
    at least one optical waveguide;
    at least one sensing element disposed in a portion of the optical waveguide;
    a feedthrough element designed to isolate a first portion of the transducer in communication with the sensing element from a second portion of the transducer containing the sensing element, wherein:
       the feedthrough element comprises a seal formed by a first portion of the optical waveguide in contact with a bore extending through a housing of the feedthrough element; and
       a portion of a mating surface of the bore for forming the seal is undercut to reduce at least one of a magnitude or a gradient of a stress distribution in a region transitioning from high stress to no stress along the first portion of the optical waveguide; and
    a member in contact with a second portion of the optical waveguide and configured to apply a pre-loading force to promote sealing of the seal, wherein the second portion of the optical waveguide has a greater outer diameter than the first portion of the optical waveguide.

12. The optical transducer of claim 11, further comprising a diagnostic grating disposed in the optical waveguide allowing the pre-loading force to be measured.

13. The optical transducer of claim 11, wherein a portion of a surface of the member is undercut to reduce at least one of a magnitude or a gradient of a stress distribution in a region transitioning from high stress to no stress along the second portion of the optical waveguide.

14. The optical transducer of claim 11, wherein the pre-loading force is applied such that a bending force on the optical waveguide during assembly is avoided.

15. A feedthrough assembly, comprising:
    at least one conductive line;
    a feedthrough element designed to isolate a first portion of the assembly from a second portion of the assembly, wherein the feedthrough element comprises a first seal formed by a first portion of the line in contact with a bore extending through a housing of the feedthrough element and wherein a portion of a mating surface of the bore for forming the first seal is undercut to reduce at least one of a magnitude or a gradient of a stress distribution in a region transitioning from high stress to no stress along the first portion of the line; and
    a member in contact with a second portion of the line and configured to apply a pre-loading force to promote sealing of the first seal, wherein the second portion of the line has a greater outer diameter than the first portion of the line.

16. The assembly of claim 15, wherein the line comprises at least one of an optical waveguide or a wireline.

17. The assembly of claim 15, wherein the feedthrough element further comprises a second seal formed by contact between an arrangement of sealing elements with a third portion of the line and an inner surface of the feedthrough housing.

18. The optical transducer of claim 5, further comprising another housing surrounding the member and the third portion of the optical waveguide, wherein the other housing is retained axially in a manner allowing a center of the other housing to be shifted radially with respect to a center of the bore of the feedthrough housing to avoid the bending force on the optical waveguide during assembly.

19. The optical transducer of claim 18, wherein the other housing comprises a flange configured to be retained axially by one or more bayonet-shaped retention members.

20. The optical transducer of claim 1, wherein the third portion of the optical waveguide is flared.

* * * * *